April 12, 1927.
M. R. SHIPLEY
1,624,512
HIGH PRESSURE COCK HAVING AUTOMATIC SEATING PLUG
Filed Feb. 2, 1925     2 Sheets-Sheet 1
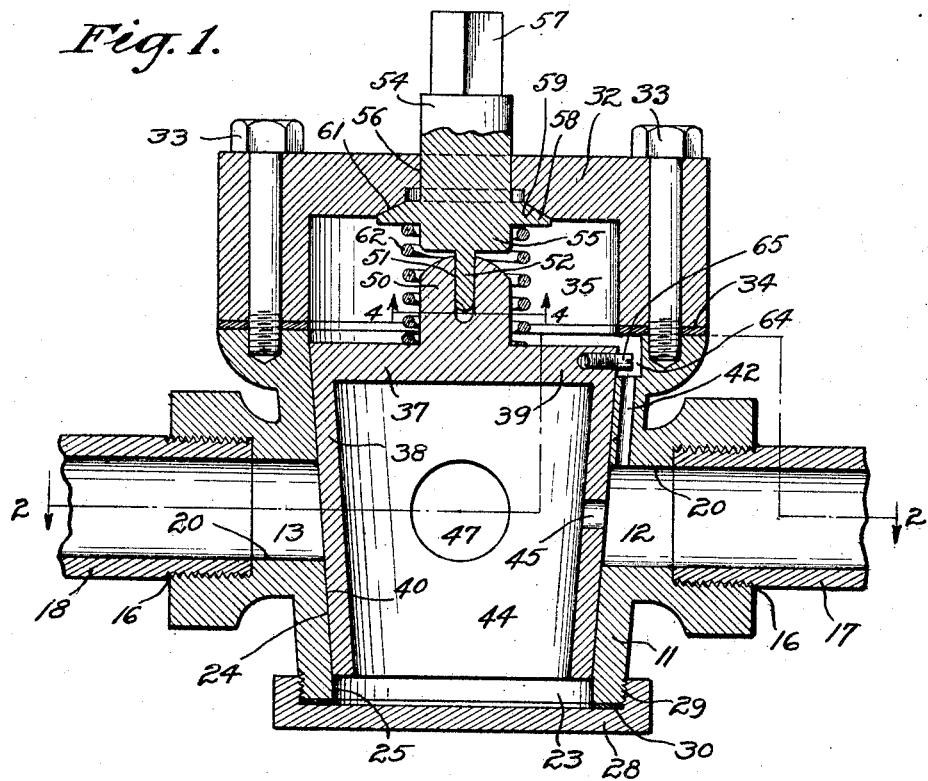
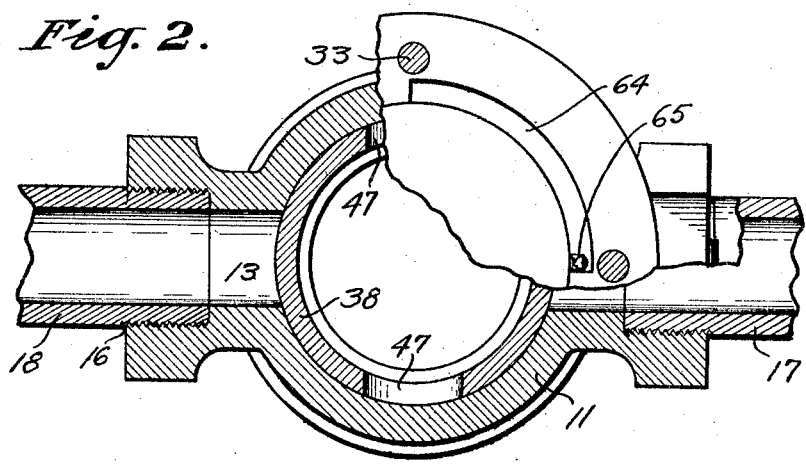
INVENTOR.
MARION R. SHIPLEY,
BY
ATTORNEYS.

April 12, 1927.
M. R. SHIPLEY
1,624,512
HIGH PRESSURE COCK HAVING AUTOMATIC SEATING PLUG
Filed Feb. 2, 1925    2 Sheets-Sheet 2
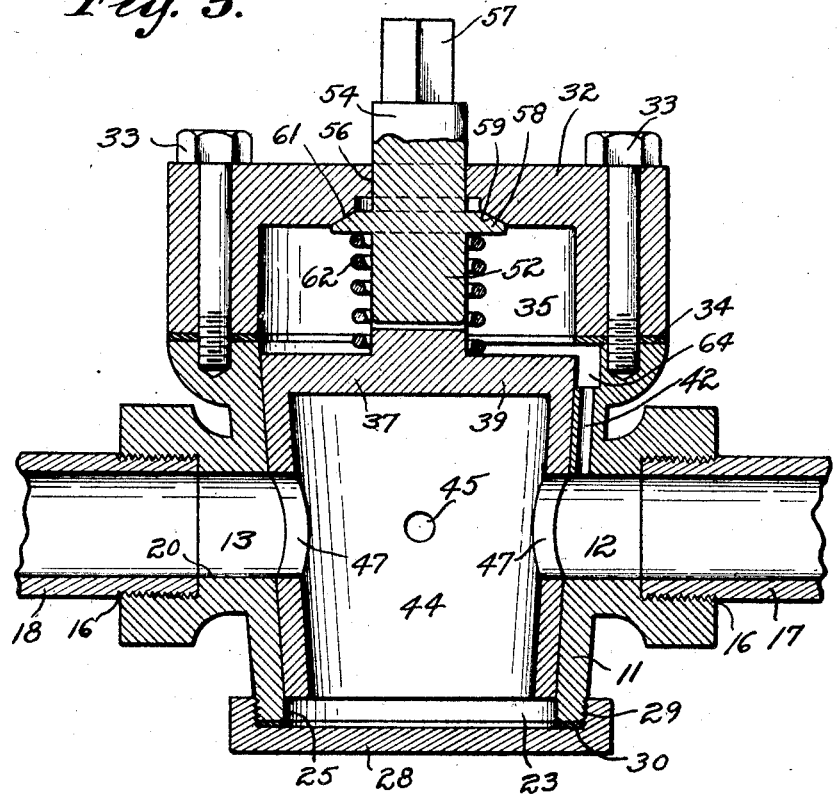
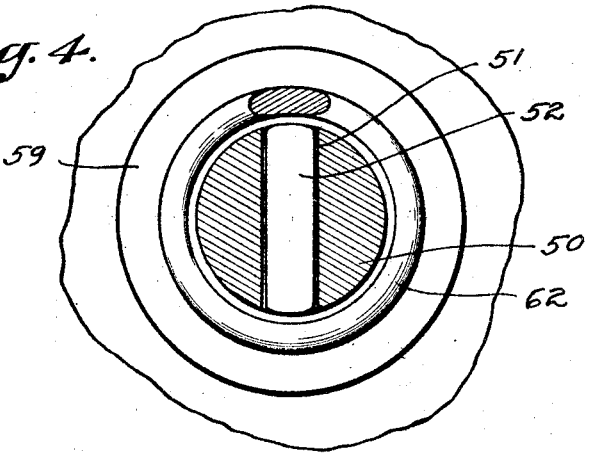
INVENTOR.
MARION R. SHIPLEY,
BY *Fred N. Lawn*
ATTORNEYS.

Patented Apr. 12, 1927.

1,624,512

UNITED STATES PATENT OFFICE.

MARION R. SHIPLEY, OF MANHATTAN BEACH, CALIFORNIA, ASSIGNOR, BY MESNE ASSIGNMENTS, TO OIL APPLIANCE MANUFACTURING CORPORATION, OF LOS ANGELES, CALIFORNIA, A CORPORATION OF CALIFORNIA.

HIGH-PRESSURE COCK HAVING AUTOMATIC SEATING PLUG.

Application filed February 2, 1925. Serial No. 6,299.

This invention relates to stop cocks employed for controlling the passage of liquid and gas through pipe lines, and it relates particularly to a cock which is adaptable for use on high pressure lines.

Cocks of this character generally comprise a body having a passage through which a fluid is conducted. A conical seat is formed in the body for receiving a conical plug, which is adapted to control the liquid flow through the body. The conical plug is provided with an opening therethrough through which fluid passes when it is aligned with the passage through the body. When the plug is positioned so that the opening therein does not align with the passage in the body, a flow of fluid therethrough will be prevented.

There are various means employed for retaining the plug in its seat to prevent leakage. Packing glands and similar arrangements are employed, the nut being screwed down causing the packing to engage with the plug, thus holding it tightly in its seat. An arrangement of this character demands constant readjustment as the plug wears in order to prevent leakage between the seat and the conical face of the plug. When cocks, employing these means for retaining the plug seated, are used on steam or hot fluid lines, there is a great tendency for the plug to bind because, as the parts become heated, they expand and no means is provided to compensate for this expansion. Another manner of holding the plug seated employs a spring which resiliently retains the plug in its seat. This arrangement is fairly successful on low pressure lines when the cock is new, but is inefficient as the plug and seat wear, owing to the fact that the resiliency of the spring decreases as the plug is forced downwardly into the seat. The packer type of cock is used on high pressure lines for this reason. It is necessary to screw the nut quite tightly against the plug so that a tight seal is effected, this being necessary when these cocks are employed on high pressure lines. A tight seating of the plug causes binding and makes the valve of the cock difficult to manipulate.

It is an object of this invention to provide a cock having a plug which is automatically retained in its seat at a constant pressure and which is so arranged as to compensate for wear or expansion of the parts and which will not bind.

It is another object of the invention to provide a cock in which the pressure of the fluid being conveyed through the cock will be utilized and retaining the plug in its seat. In my invention I eliminate the use of packing glands, screw and spring arrangements and other mechanical contrivances and consequently eliminate the disadvantages associated therewith.

It is a still further object of the invention to provide a cock utilizing the fluid pressure conveyed through the valve for retaining the plug in its seat which will utilize only a portion of this pressure in effecting the seating of the plug. A cock of this character is very suitable for high pressure use. If the entire fluid pressure were employed to seat the plug where exceedingly high fluid pressure existed, this pressure might be sufficiently high to cause the plug to bind.

It is another object of the invention to provide a cock which may be readily disassembled and conveniently cleaned.

It is a further object of the invention to provide in a cock of this character a means for retaining the plug seated when no fluid pressure exists. By retaining the plug seated at all times, dust or other abrasive is excluded from the contacting surfaces and avoidable attrition of these surfaces is eliminated.

It is another object of the invention to provide a plug and rotating arrangement in which an axial movement between the plug and stem of the cock is provided.

Other objects and advantages of the invention will be made evident hereinafter.

Referring to the drawing which is solely for illustrative purposes and in which I illustrate a preferred form of my invention.

Fig. 1 is a vertical sectional view through a cock employing the features of my invention, the plug member in this view being shown in closing position.

Fig. 2 is a section taken as indicated by the line 2—2 of Fig. 1.

Fig. 3 is a vertical sectional view of the cock shown in Fig. 1 except that the plug is shown in open position.

Fig. 4 is a fragmentary sectional view taken as indicated by the line 4—4 of Fig. 1.

The form of my invention shown in the drawings has a body 11 in which an inlet port 12 and an outlet port 13 is formed, these ports being formed in opposite positions of the body 11 and being in axial alignment with one another. The ports 12 and 13 are counterbored and threaded, as indicated at 16, to receive inlet and outlet pipes 17 and 18, respectively. The inlet and outlet ports 12 and 13 are counterbored so that the diameters of the inner portions 20 will be the same as the internal diameter of the inlet and outlet pipes 17 and 18. A central opening 23 is provided in the body 11 with which the inlet and outlet ports 12 and 13 connect. The opening 23 has a conical portion which provides a conical seat 24, and has a cylindrical portion 25. The smaller or lower end of the opening 23 is closed by a cover 28 which threads on the body at 29, there being a gasket 30 to provide a fluid tight seal between these parts. A cap 32 is secured at the upper part of the body 11 by means of cap screws 33, there being a gasket 34 disposed between the adjacent faces of the cap 32 and the body 11 to provide a fluid tight relationship therebetween. The cap 32 is provided with an equalizing cavity 35 which as clearly shown in the drawings connects with the upper portion of the opening 23.

A plug 37 is disposed in the opening 23, this plug 37 having a conical seat 38 and a radial wall 39 formed across the upper or larger end of the shell 38. The outer face 40 of the shell 38 is arranged to contact with the conical seat 24. A by-pass 42 connects between the inlet port 12 and the equalizing cavity 35 of the cap 32. Whenever a fluid pressure exists in the port 12, the fluid passes through the by-pass 42 into the cavity 35. The fluid in the cavity 35 will exert a pressure upon the upper face of the plug 37 and force the plug downward with a pressure proportionate to the area of the upper exposed face. It will be seen that this arrangement serves to retain the plug tightly in its seat. When a cock of this character is used for low pressure lines of 80 to 100 pounds, this arrangement is very favorable; however, when used upon high pressure lines, the seating pressure resultant from the fluid pressure would be great enough to cause the plug to bind and to be difficult to operate. I, therefore, provide means for equalizing or reducing the seating pressure.

I accomplish this by providing the plug 37 with an internal chamber 44 which is closed at the upper or larger end by the radial wall 39, and which is open at the lower or small end thereof. When the plug is in closing position, a passage 45 connects the internal chamber 44 with the inlet port 12 and permits fluid in the passage 12 to enter the chamber. The fluid in this chamber builds up a pressure which tends to force the plug 37 in an upward direction, that is, the pressure of the fluid in the internal chamber 44 exerts a pressure against the radial wall 39. According to physical law which is well understood in the art, the pressure of the fluid against the plug 37 is proportionate to the area of cross section of the lower ends of the plug. From the drawings, it will be observed that the lower end of the plug 37 is smaller than the upper end of the plug. Consequently, the downward pressure or the pressure which tends to seat the plug exceeds the upward pressure or the pressure which tends to unseat the plug. The plug will be retained in its seat by a force equal to the difference between these two opposing pressures. As the fluid pressure increases, the difference in these opposing pressures becomes greater and the plug is held seated with greater force. This is desirable owing to the fact that the higher the fluid pressure, the more strenuous the seal necessary to prevent leakage.

In Fig. 3, I show the plug 37 rotated into open position. When the plug is in this position, openings 47 align with the inlet and outlet ports 12 and 13 and permit fluid to flow through one opening 47, the internal chamber 44, the other opening 47 and the outlet port 13. In this position the fluid is conveyed into the internal chamber 44 through the opening 47. There is a fluid pressure in the cavity 35 and in the internal chamber 44 regardless of the two positions of the plug 37 whenever a fluid pressure exists in the inlet port 12.

My invention also provides a novel means whereby the plug 37 is rotated, as shown in Figs. 1, 3 and 4 of the drawing. I provide a hub formation 50 on the upper face of the wall 39 and concentric with the plug 37. The hub 50 is provided with a cross slot 51 into which a tongue 52 of a stem 54 extends. This tongue 52 is formed on the lower end of a cylindrical portion 55 of the stem, this cylindrical portion 55 extending through an opening 56 in the cap 32 and having a squared formation 57 arranged for accommodating a suitable wrench for manipulating the same. An annular flange 58 having a bevel face 59 is provided on the lower part of the cylindrical portion 55 and is situated inside the cavity 35. The face 59 is arranged for engagement with a complementary face 61 formed on the wall of the chamber 35 encompassing the opening 56. When a fluid pressure exists in the chamber 35, this pressure is effective in retaining the faces 59 and 61 in engagement, thus providing a tight seal between these parts and preventing a leakage of fluid from the chamber 35 through the passage 56. A coil spring 62 is disposed around the hub 50 and the lower end 55 of the stem 54, this spring exerting a pressure against these members which tend to resiliently maintain them in their proper seated positions when no fluid pressure is present. This spring is provided for seating the plug and the stem so as to exclude dirt or other abrasive from the valve, and to prevent an entrance of abrasive from the contacting faces to prevent leakage, thus preventing an excessive wear of these contacting parts. When the stem 54 is rotated by the application of a wrench to the squared end 57, the tongue 52 engages the walls of the slot 51, thus rotating the plug 37. This plug and stem construction permits relative axial movement and permits the proper seating of both members. As wear occurs between the contacting surfaces the plug and stem may seat without opposition.

A slot 64 is provided at the upper end of the opening 23 and into this slot 64 there extends a pin 65 which is secured to the extreme upper end of the shell 38. The slot 64 permits a 90 degree rotation of the plug 37. This arrangement is provided so that it would be impossible to rotate the plug so that the passage 45 will align with the outlet port 13 and not with the inlet port 12, the disadvantage of this being that there would be no fluid pressure in the internal chamber 44, and, because there would be no opposing force to resist the seating pressure, there might be a tendency for the plug 37 to bind.

From the drawings and the foregoing description, it is evident that there are no parts of the cock which will get out of order and which will need replacing. By utilizing the pressure of the fluid for seating the plug and the stem, the wear of these parts is automatically compensated for. In other words, a wearing of the parts does not affect the seating pressure exerted thereagainst. In old types of cocks, it is necessary to constantly readjust the seating means when wear occurs owing to the fact that there is no automatic compensating arrangement.

My invention is designed so that it may readily be cleaned. By removing the cover 28 and the cap 32, the stem and plug may be removed and the cock conveniently cleaned. By providing the inner ends 20 of the passages 12 and 13 of the same diameter as the pipes 17 and 18, it is possible for the pipe lines to be swabbed or cleaned as is compulsory in some instances. Dust and other foreign matter is entirely excluded from the valve by the provision of the spring 62 which retains the plug and stem seated, and no dust can enter between the faces 59 and 61.

My invention is particularly adaptable for use on high pressure lines, as previously described, because of the fact that there will be no binding of the plug 37 due to the novel equalizing arrangement which I employ. As the fluid pressure increases, the effective seating pressure also increases and, consequently, an additional sealing relationship is provided.

I claim as my invention:

A cock comprising: a body having a central chamber in the side walls of which is formed a frusto-conical seat, inlet and outlet ports being formed in said body and opening from said seat; a frusto-conical plug shell adapted to fit said seat to close the opening of said ports into said chamber, there being openings in said shell which by the rotation of said shell may be brought into registry with said ports to set up a passage between said ports through said shell, said shell being open at its end of smaller diameter, a passage being formed in the wall of said shell which communicates directly between the interior of said shell and said inlet port when said shell is rotated to place said openings out of registry with said ports; a head provided upon said plug shell to close its end of larger diameter; a closure provided upon said body for closing said central chamber at its end of smaller diameter; a cap provided upon said body to close said central chamber at its end of larger diameter, said cap being shaped to provide a plug shell seating pressure chamber co-extensive with the larger end of said central chamber, there being a duct formed in said body to communicate between said inlet port and said pressure chamber; a valve stem rotatably disposed in a central opening in said cap and by which said shell plug may be rotated.

In testimony whereof, I have hereunto set my hand at Los Angeles, California, this 27th day of January, 1925.

MARION R. SHIPLEY.